Aug. 29, 1961 J. H. EDWARDS 2,998,597
ILLUMINATED INDICATOR
Filed Dec. 21, 1959

INVENTOR.
JAMES H. EDWARDS
BY D.C. Roylance
ATTORNEY

United States Patent Office 2,998,597
Patented Aug. 29, 1961

2,998,597
ILLUMINATED INDICATOR
James H. Edwards, Newtown, Conn., assignor to American Machine and Foundry Company, a corporation of New Jersey
Filed Dec. 21, 1959, Ser. No. 861,067
9 Claims. (Cl. 340—378)

This invention relates to illuminated indicators useful for example, for the illuminated display of indicia and the like in connection with the operation of a machine, the carrying out of sequential process steps, and like procedures where stagewise visual indications are desirable.

It is now standard practice in numerous arts to employ illuminated indicators including a plurality of selectively operated light sources each associated with a particular display or indicating surface, the arrangement being such that activation of each light source yields a particular indication. While various forms of such indicators have been proposed, prior art devices of this type have not been entirely satisfactory when subjected to shock and vibration in use.

A general object of the invention is accordingly the provision of an illuminated indicator which is highly resistant to mechanical shock and vibration, so as to be especially durable in many of the modern applications for such devices.

Another object is to provide an illuminated indicator of the type described involving, in addition to fasteners, only two separate units each of which is especially resistant to shock and vibration.

A further object is to provide a novel multi-path light transmitting unit for illuminated indicators.

In order that the manner in which these and other objects are attained, in accordance with the invention, can be understood in detail, reference is had to the accompanying drawings, which form a part of this specification, and wherein.

Turning now to the drawings in detail, it will be seen that the embodiment of the invention here illustrated comprises a light transmitting assembly indicated generally at 1, a housing indicated generally at 2 and a plurality of lamps 3 carried by the housing.

Figure 5:
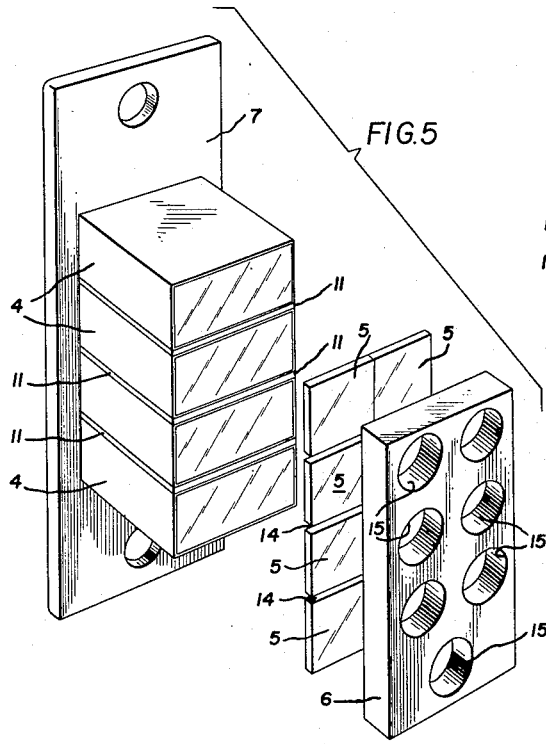
FIG. 5 is an exploded perspective view of the light transmitting assembly of the device of FIG. 1.

Light transmitting assembly 1 comprises a plurality of light transmitting blocks 4, a plurality of color filter elements 5, a back plate 6, a front plate 7, and a plurality of flat translucent members 8 each secure to, as by adhesive, the front end face of a different one of blocks 4. Blocks 4 can be of any suitable material having good uniform light conducting properties. Advantageously, blocks 4 are of a clear transparent polymerized methyl methacrylate resin composition. Blocks 4 are arranged in a vertical series with translucent members 8 disposed in openings in plate 7, so that the front faces of all of the members 8 can be viewed from in front of plate 7. Equal in length, blocks 4 have identical rectangular transverse cross-sections. The uppermost three blocks 4 are of uniform transverse cross-section throughout their lengths and the uppermost three members 8 are similarly rectangular, all being disposed in a common rectangular opening 9 in plate 7. The member 8 secured to the lower block 4 is circular and is disposed in a corresponding circular opening 10 in plate 7. Behind plate 7, all of the blocks 4 have the same rectangular plan. Accordingly, like side faces of all of the blocks lie in a common vertical plane and the rear end surfaces or light entry faces of all of the blocks also lie in a common vertical plane, as illustrated in FIG. 5.

Between each adjacent pair of blocks 2 there is interposed a laminated, thin, light barrier sheet 11 comprising outer or face laminae 12 of white polyvinyl resin material and an inner lamina 13 of black polyvinyl resin material. The exposed faces of laminae 12 are cemented to the matching faces of the adjacent blocks 4 by any suitable adhesive. Thus, the blocks 4 and sheets 11 are adhered together to form a self-supporting unitary assembly.

The width and length of each sheet 11 are substantially equal to the corresponding dimensions of blocks 4. Accordingly, the forward end portions of the uppermost three blocks and the forward end portions of the three sheets 11 form a rectangular, forwardly projecting portion of the block assembly, which portion completely fills opening 9. Plate 7 is rigidly secured to the block assembly in any suitable manner. Thus, for example, the walls of openings 9 and 10 can embrace the corresponding portion of the block assembly in a "shrink fit," as is well known in the plastics fabricating art. Alternatively, plate 7 can be cemented to the block assembly by means of a suitable adhesive.

Color filter elements 5 are flat, plate-like elements, the lower one thereof being rectangular in plan and having substantially the same dimensions as, and being cemented directly to, the rear end face of the lower block 4. A pair of the filter elements 5 is provided for each of the three upper blocks 4. The filter elements of each such pair have plan dimensions such that each element of the pair will cover one lateral half of the rear end face of the corresponding block 4 and the filter elements of each such pair are accordingly disposed edge-to-edge, as seen in FIG. 5, and cemented directly to the rear end face of the corresponding block 4. Since the vertical dimensions of filter elements 5 and the rear end faces of blocks 4 are the same, and since elements 5 are centered on the rear end faces of the blocks, there is a space 14, FIG. 5, between vertically adjacent ones of filter elements 5, the height of which space is equal to the thickness of one of the sheets 10.

Back plate 6 is opaque, advantageously formed from a black phenolic resin composition. Plate 6 has the same rectangular plan presented by the rear end of the block assembly, as will be clear from FIG. 5, and is of substantial thickness as compared to filter elements 5. Back plate 6 is provided with seven circular openings 15 each approximately centered with respect to a different one of the filter elements 5. Plate 6 is secured to the filter elements 5, and to the block assembly, by an adhesive material which is opaque and resilient when in "set" or cured condition. Thus, any suitable conventional adhesive composition based on rubber or synthetic rubber, but capable of bonding tenaciously to provide a permanent assembly, can be employed. Indicated at 16, FIG. 4, this adhesive is not only disposed between the adjacent faces of plate 6 and filter elements 5 but also completely fills the spaces 14 between the filter elements. The portions of color filter elements 5 registering with openings 15 are left rearwardly exposed.

Figure 4:
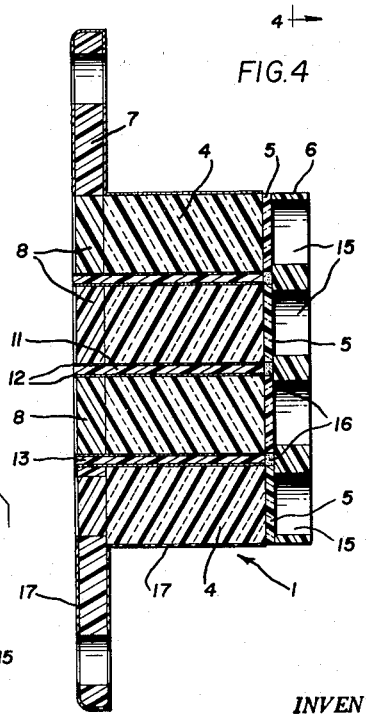
FIG. 4 is a sectional view taken on line 4—4 of FIG. 3.

The exposed surfaces of plate 7 and the peripheral surfaces (that is, the top, bottom and side surfaces) of the block assembly are covered by an opaque film provided by painting or in any other suitable manner, as indicated at 17, FIG. 4. The front end faces of blocks 4 are left exposed. Hence, any light directed forwardly, through one of the filter elements 5 is confined to the corresponding block 4 and escapes via the front face thereof and the corresponding translucent member 8, the latter providing uniform distribution of the light over the exposed front face thereof. In this regard, it is to be noted that the outer laminae 12 of sheets 11 are reflective, and the opaque center laminae 13 are incapable of passing light. With filter elements 5 of different colors, transfer of light of one color from one block 4 to the next is precluded by sheets 11, and sheets 11 and opaque film 17 cooperate to substantially completely eliminate loss of light from the blocks 4.

Figure 1:
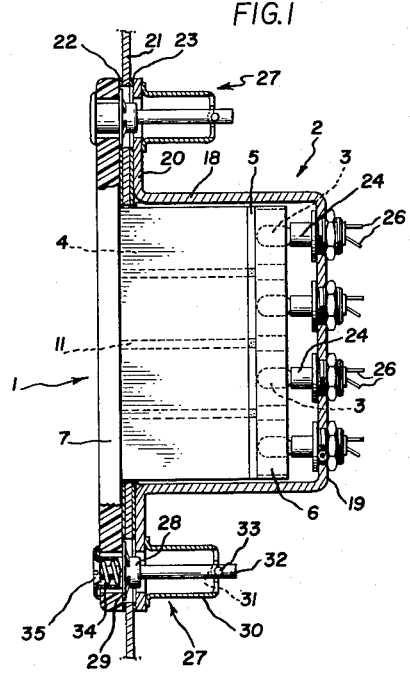
FIG. 1 is a vertical sectional view, with some parts shown in elevation, of an illuminated indicator constructed in accordance with one embodiment of the invention.

Housing 2 is of sheet metal, including a main hollow portion 18, of rectangular transverse cross-section, open at the front and closed at the back by rear wall 19, the open front of the housing being surrounded by an integral, continuous, rectangularly extending, outwardly directed mounting flange 20. The transverse dimensions of hollow portion 18 of the housing are such that the assembly of blocks 4 can be freely received therein, as seen in FIG. 1. The depth of portion 18 of the housing is somewhat greater than the distance from the rear face of back plate 6 to the rear face of front plate 7. The device is adapted for mounting on a panel 21, FIG. 1, having an opening to accommodate the block assembly. Rectangular gaskets 22, 23 extend about such opening on the front and back sides, respectively, of panel 21, flange 20 of housing 2 engaging gasket 23 and the rear face of plate 7 engaging gasket 22.

With the parts in the positions just mentioned, as seen in FIG. 1, the rear face of plate 6 is spaced forwardly from rear wall 19 of housing 2 by a distance approximately equal to the thickness of plate 6. Rear wall 19 of the housing is provided with a plurality of openings each aligned with a different one of the openings 15 in plate 6. In each such opening in wall 19, there is mounted a lamp socket 24 of conventional construction, and an electric lamp 3 is operatively arranged in each socket. Sockets 24 are provided with connector lugs, as at 26, via which the lamps 3 are connected to any suitable electrical circuit (not shown) arranged for selective energization of the lamps. The dimensions of the parts are such that the lamps 3 are each disposed substantially entirely within one of the openings 15 in plate 6, the thickness of plate 6 approximately the length of the clear portions of lamps 3, as shown in FIG. 1.

Housing 2 and light transmitting assembly 1 are secured together and to panel 21 by two quick detachable, resilient fasteners, indicated at 27. Each such fastener comprises a forwardly flanged sleeve 28 disposed in a suitable bore through plate 7 and secured to the plate by a friction fastener 29 at the back of the plate, the front end of the sleeve being open and the opposite end being provided with an apertured end wall. Sleeve 28 extends through suitable openings in panel 21 and flange 20 of housing 2 and is aligned with a fixed fastener element 30 of cup-like configuration, the open end of element 30 being fixed to flange 20 and the body of element extending rearwardly of the flange. The rear wall of element 30 is provided with a central opening, a cross-slot and a rearwardly facing diametrically extending indentation 31. A headed movable fastener element 32 extends through sleeve 28, projecting through the apertured end wall thereof and then entirely through the rear wall of element 30. At its tip, element 32 is provided with a crossbar 33 disposed in indentation 31. The fastener is completed by a compression spring 34 disposed within sleeve 28 between the end wall of the sleeve and the head 35 of element 32. With the fastener engaged as shown, springs 34 act to apply a resilient clamping pressure urging plate 7 and flange 20 toward each other and against panel 21. Commencing with cross-bar 33 in indentation 31, element 32 can be forced rearwardly, against the action of spring 34, rotated 90°, and withdrawn via the cross-slot in the rear wall of element 30 to disengage the fastener.

The entire assembly is particularly devised for maximum resistance to shock and vibration, elements 4, 5, 7 and 11 forming a rigid unit to which back plate 6 is resiliently bonded, and housing 2 and sockets 24 forming a simple, rigid unit, the two units being secured firmly to panel 21, under resilient clamping pressure, by fasteners 27.

Figure 2:
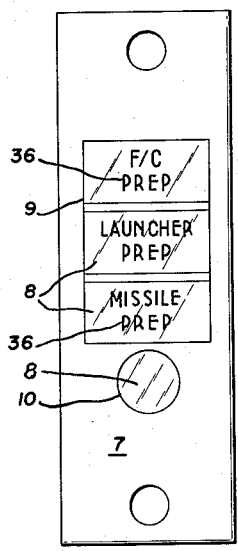
FIG. 2 is a front elevational view of the device of FIG. 1.
Figure 3:
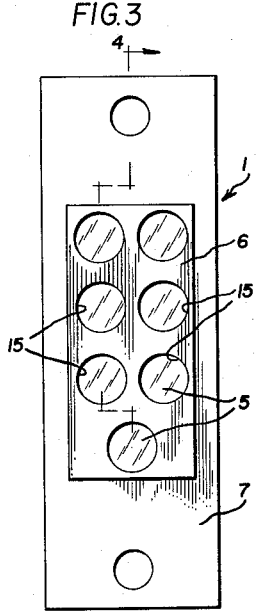
FIG. 3 is a rear elevational view of the light transmitting assembly of the device of FIG. 1.

The front end face of one or more of the blocks 4 is provided with any desired indicia, as at 36, FIG. 2. Thus, the indicia may be applied by silk screening with an opaque coating material, the remainder of the face of the block being left untreated. With lamps 3 selectively energized, and with filter elements 5 being of different colors, energization of any lamp will illuminate the front face of the corresponding block 4 in the color of the filter element 5 carried by that block.

What is claimed is:

1. In an illuminated display device, the combination of a plurality of light conducting members each having a plane end surface constituting a light entry face; a plurality of opaque light barriers; said light conducting members being arranged in a series with said light entry faces disposed in a common plane and with one of said light barriers disposed between each adjacent pair of said light conducting members; means securing said light conducting members and light barriers together as a unitary assembly having a peripheral surface constituted by edges of said light barriers and faces of said light conducting members; opaque means covering said peripheral surface; a plurality of flat color filter elements each secured to the light entry face of a different one of said light conducting members; an opaque member having a plurality of openings, said opaque member being secured to said color filter elements with each of said openings aligned with a different one of said color filter elements; a housing having a first portion surrounding said peripheral surface of said unitary assembly and a second portion spaced from and extending generally parallel to said opaque member; a plurality of lamp sockets mounted on said second portion of said housing and each aligned with a different one of the openings of said opaque members, a plurality of lamps mounted in said sockets and projecting each into a different one of said openings; and mounting means adapted to detachably mount said unitary assembly in said housing with the ends of said light conducting members opposite said light entry faces exposed for view.

2. An illuminated display device in accordance with claim 1 and wherein said mounting means comprises an annular flange on said housing, a matching flange carried by said unitary assembly, and fastening means arranged to urge said flanges resiliently toward each other.

3. An illuminated display device in accordance with claim 1 and wherein said light barriers are flat sheets, the faces of said light conducting members between which said barriers are disposed are plane faces, and said light barriers are cemented to said light conducting members.

4. An illuminated display device in accordance with claim 3 and wherein certain of said color filter elements are spaced from each other in a direction parallel to the common plane of said light entry faces, said opaque member is secured to said color filter elements by an opaque resilient adhesive, and said adhesive fills the spaces between said color filter elements.

5. In an illuminated display device adapted to be mounted on a panel constructed from sheet material and having an aperture therein, the combination of a unitary light transmitting assembly comprising a plurality of light conducting blocks of like polygonal transverse cross-section, each of said blocks having a flat end surface constituting a light entry face; a plurality of relatively thin, flat light barrier sheets, said blocks being arranged in a series with said light entry faces disposed in a common plane, one of said light barrier sheets being disposed between each adjacent pair of said blocks, said blocks and light barrier sheets being cemented together to form an integral unit having a peripheral surface constituted by edges of said light barrier sheets and faces of said blocks, opaque means covering said peripheral surface, a plurality of flat color filter elements, each of said filter elements being cemented to the light entry face of one of said blocks, an opaque back plate having a plurality of openings, said back plate being cemented to said filter elements with each of said openings aligned with a different one of said filter elements, and an opaque front plate secured to the end portions of said blocks opposite said light entry faces, said front plate projecting transversely from said blocks adapted to be disposed in front of and in engagement with the front face of the panel in a position such that said light entry faces are spaced from the rear face of the panel and said integral unit extends through the aperture of the panel, end portions of said blocks opposite said light entry faces being exposed for view from in front of said front plate; a hollow housing surrounding said blocks and including an end wall spaced from said back plate, said end wall carrying a plurality of lamp sockets each aligned with a different one of the openings in said back plate, lamps when mounted in said sockets projecting into said openings, said housing including a flange extending parallel to said front plate and adapted to engage the rear face of the panel when said light transmitting assembly is operatively disposed in said housing; and fastening means connected to said flanges and operative to urge the same together and thereby sandwich the panel therebetween.

6. A unitary light transmitting assembly for illuminated indicators of the type described, comprising a plurality of light conducting blocks of like polygonal transverse cross-section, each of said blocks having a flat end surface constituting a light entry face; a plurality of thin, flat light barrier sheets, said blocks being arranged in a series with said light entry faces lying in a common plane and with one of said light barrier sheets disposed between each adjacent pair of said blocks, said blocks and sheets being cemented together; and a front plate secured to the end portions of said blocks opposite said light entry faces, said front plate projecting transverse from said blocks, and said portions of said blocks opposite said light entry spaces being exposed for view from in front of said plate; a plurality of thin, flat color filter elements each cemented to one of said light entry faces, and an opaque member having a plurality of lamp-receiving openings, said opaque member being cemented to said filter elements with each of said openings registered with a different one of said filter elements.

7. A light transmitting assembly in accordance with claim 6 and wherein certain of said color filter elements are spaced apart in a direction parallel to said common plane by distances substantially equal to the thickness of said light barrier sheets, and said opaque member is cemented to said filter by an opaque, resilient adhesive which fills the spaces between said filter elements.

8. A light transmitting assembly in accordance with claim 6 and wherein each of said light barrier sheets is a laminated sheet having light reflecting face laminae and an opaque inner lamina.

9. In an illuminated display device, the combination of a unitary light transmitting assembly comprising a plurality of light conducting blocks of like rectangular transverse cross-section, each of said blocks having a flat end surface constituting a light entry face, a plurality of thin, flat light barrier sheets, said blocks being arranged in a stack with said light entry faces lying in a common plane and with one of said light barrier sheets disposed between each adjacent pair of said blocks, said blocks and sheets being cemented together, a plurality of thin, flat color filter elements each secured to a different one of said light entry faces, and an opaque plate having a plurality of lamp-receiving openings, said opaque plate being cemented to said filter elements with each of said openings registered with one of said filter elements; and a plurality of lamps mounted so that each of said lamps extends into a different one of said openings, each of said lamps having a light conducting portion of substantially the same length as the thickness of said opaque plate whereby said light conducting portion is disposed substantially entirely within its associated opening.

References Cited in the file of this patent

UNITED STATES PATENTS

| | | |
|---|---|---|
| 2,286,014 | Rowe | June 9, 1942 |
| 2,462,243 | Winkler et al. | Feb. 22, 1949 |
| 2,619,068 | Malheiros et al. | Nov. 25, 1952 |
| 2,825,260 | O'Brien | Mar. 4, 1958 |

FOREIGN PATENTS

| | | |
|---|---|---|
| 1,087,890 | France | Sept. 1, 1954 |
| 809,130 | Great Britain | Feb. 18, 1959 |